June 3, 1930.  A. HOMANN  1,761,077
MULTIPLE PROPELLER DRIVE FOR AIRPLANES
Filed Nov. 4, 1929
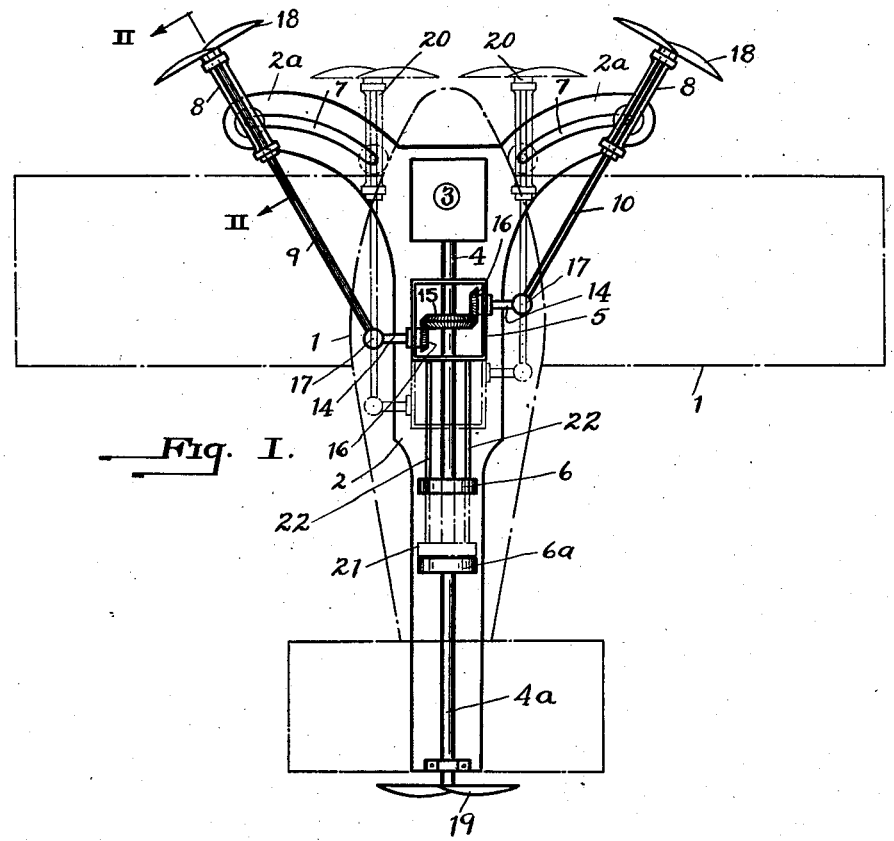
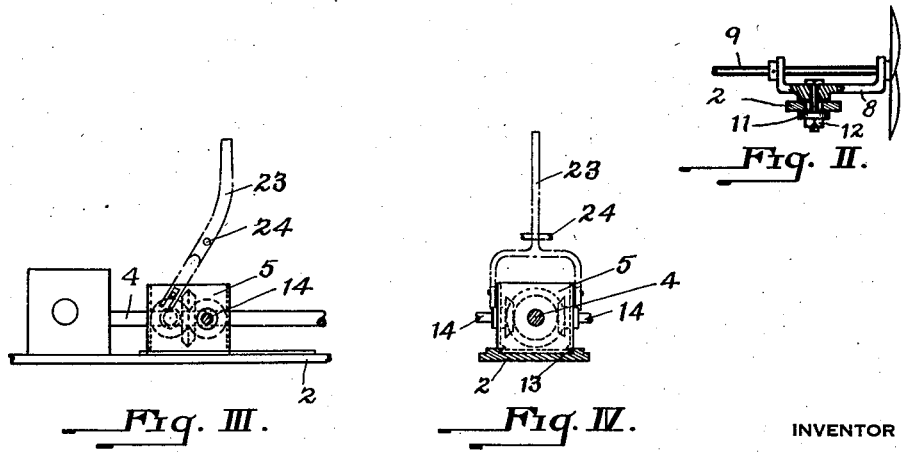
INVENTOR
Albert Homann
by Christy Christy & Wharton
his attorneys Patented June 3, 1930

1,761,077

UNITED STATES PATENT OFFICE

ALBERT HOMANN, OF PITTSBURGH, PENNSYLVANIA

MULTIPLE-PROPELLER DRIVE FOR AIRPLANES

Application filed November 4, 1929. Serial No. 404,646.

This invention relates to airplanes, and particularly to the organization of propellers to motivate airplanes.

It is desirable to provide improvements in the construction of airplanes which will permit the ship to land within a small ground area. An airplane usually has its propeller operatively so mounted that the axis of rotation of the propeller lies in coincidence with a vertical plane extending centrally through the nose and the tail of the fuselage. In a multi-propeller plane the propellers are disposed on opposite sides of the fuselage, and their axes of rotation extend in planes lying parallel to the said vertical central plane of the fuselage. When a propeller is so arranged, it creates during rotation a maximum movement of air to lift the plane and move it over the ground. I propose to mount two propellers symmetrically on an airplane, and on opposite sides of the fuselage forwardly of the main plane or planes, and to provide adjustable driving connections from the motor of the airplane to the propellers, whereby the propellers may be axially inclined to each other (inclined to the sides of the fuselage) to obtain decreased components of the forces tending to move the ship horizontally. Such arrangement in addition to permitting the landing of the plane within a small ground area, also permits the necessary forces to be obtained in order to prevent tail spins and other dangerous and undesired evolutions.

In the practice of my invention, I may employ the arrangement illustrated in the accompanying drawings; Figure I is a view in plan, showing schematically an arrangement of propellers and operable connections therefrom to the motor of an airplane; Figure II is a view taken on the plane II—II of Figure I, showing partially in side elevation and partially in cross section a bracket in which a propeller shaft may be trunnioned; Figure III is a view in side elevation, showing the transmission housing wherein suitable gears are arranged to transmit rotation from the airplane motor to the propeller shafts; and Figure IV is an end elevation of the transmission housing, showing in cross section the fuselage frame upon which the transmission housing is slidably mounted.

Referring to the drawings, the wings and fuselage of the airplane are indicated by the broken lines 1. Adjacent the bottom of the fuselage there is rigidly incorporated in the airplane structure, a frame 2, which is formed of duralumin or other suitable material. Upon the frame 2 the motor 3 is mounted, and extending rearwardly therefrom is a drive shaft 4. The shaft 4 passes through the transmission housing 5 to the clutch 6.

Extending forwardly of the wings of the airplane are two arcuate frame portions $2^a$, the function of these frame portions being to movably retain the propeller-shaft supporting brackets 8. As hereinbefore stated, I propose to adjust angularly the axis of rotation, in this case the shafts 9 and 10, of the propellers.

A convenient organization of instrumentalities to afford the desired adjustment may be utilized by providing the frame portions $2^a$ with arcuate ways or slots 7. Means are associated with the ways 7 to fix the supporting brackets 8 to the frame portions. The brackets are fixed to the frame portions, but they essentially have capacity of rotation, and of sliding movement in accordance with the curvature and length of the ways 7. A bolt 11 extending through the bracket 8 and slot 7 (Fig. II) serves, in conjunction with a nut 12, to suitably retain the bracket on the frame portion $2^a$. With this arrangement, obviously the desired movement of the brackets may be had.

It is necessary to transmit rotation from the motor 3 to the propellers, and manifestly adjustable connections—connections to permit angular movement of the shafts 9 and 10—must be employed. To this end, I provide a transmission housing 5 which is slidably affixed to the frame 2. A dove-tail engagement 13 between the housing and frame is satisfactory.

Within the transmission housing gears are provided to suitably convey the movement of the drive shaft 4 to the two auxiliary connecting shafts 14, which are directly connected to the propeller shafts 9 and 10. It will be noted that a master gear 15, which is slidable on the shaft 4 and fixed to rotate therewith, meshes with the gears 16 to drive the shafts 14. Universal joints 17 are incorporated to allow the angular connection and movement of the shafts 9 and 10.

The housing 5 for the gears 15 and 16 is shown open at the top, but it is preferably of closed construction and filled to keep the gears in oil, and, together with the gear 15, the housing is slidable on the shaft 4.

Figure I shows in full-lines the angular position of the propellers 18 and shafts 9 and 10, as they are adjusted preparatory to the taking-off of the plane, or in landing. They are, in a sense, arranged to pull against each other (relative to their tractive effort) without decreasing the volume of buoyant wind which they generate. Manifestly, a greater area of plane may be reactive to this wind, due to the angularity of the propellers.

Before flight the housing 5 is moved rearwardly on the frame 2 and shaft 4. The shafts 9 and 10, being trunnioned in the housing, move therewith to bring the propellers into their normal flying position, shown by dotted lines 20, or an intermediate position.

A third propeller 19 is included at the rear of the airplane, and by means of a clutch the rear propeller shaft 4ᵃ and the shaft 4 are commonly rotated. The clutch 6 comprises two portions. One portion—the portion to which the numeral 6 is immediately applied—has a sliding and keyed engagement with the shaft 4. The other clutch portion 6ᵃ is secured to the shaft 4ᵃ. As shown by the dotted lines 21, the two clutch portions unite the shafts 4 and 4ᵃ when the housing 5 is moved to bring the propellers 18 to flying position. Links 22 are attached to the housing 5, and serve to move the clutch member 6 along the shaft 4 and into engagement with the clutch member 6ᵃ.

To facilitate the control and movement of the propellers and housing 5, a yoked lever 23 may be pivotally fixed at 24 to the fuselage of the ship, and may be provided with an obvious pin and slot engagement with the housing. Oscillation of the handle will move the housing 5 on the frame 2.

It is conceivable that the several propellers may be individually driven by separate motors, and that connections equivalent to those shown may be utilized to obtain the desired angular adjustment of the propellers.

What I claim is:

1. In an airplane including two propellers arranged symmetrically thereon, a motor, a transmission housing including gears rotated by said motor, and propeller shafts adjustably connected to said gears, said gears and said housing being movable to adjust angularly the propellers and their shafts.

2. In an airplane including two propellers arranged symmetrically thereon, the combination of a motor, a shaft connected to each propeller, each shaft being connected for rotation to said motor, and a bearing for supporting each shaft on the airplane, each of which bearings are movable for permitting the propellers to be shifted along the axis of their shafts as well as angularly to each other.

3. The structure of the next preceding claim, together with means which are connected to said propeller shafts and are movable for so shifting the propellers.

4. In an airplane including two propellers arranged symmetrically thereon, a motor, a transmission housing including gears rotated by said motor, propeller shafts adjustably connected to said gears, said gears and said housing being movable to adjust angularly the propellers and their shafts, a third propeller arranged symmetrically with respect to the two said movably mounted propellers, and means whereby angular adjustment of said movable propellers and their shafts serves to connect said third propeller for actuation and to disconnect the same.

5. In an airplane including two propellers arranged symmetrically thereon, the combination of a motor, a shaft connected to each propeller, each shaft being connected for rotation to said motor, a bearing for supporting each shaft on the airplane, each of which bearings are movable for permitting the propellers to be shifted along the axis of their shafts as well as angularly to each other, a third propeller arranged symmetrically with respect to the two said movably mounted propellers, and means whereby angular adjustment of said movable propellers and their shafts serves to connect said third propeller for actuation and to disconnect the same.

In testimony whereof I have hereunto set my hand.

ALBERT HOMANN.